United States Patent
Aoki et al.

(10) Patent No.: US 7,510,996 B2
(45) Date of Patent: Mar. 31, 2009

(54) HYDROGEN STORAGE MATERIAL

(75) Inventors: Masakazu Aoki, Aichi-gun (JP);
Nobuko Oba, Aichi-gun (JP); Shin-ichi Towata, Nagoya (JP); Tatsuo Noritake, Nagoya (JP)

(73) Assignee: Kabushiki Kaisha Toyota Chuo Kenkyusho, Aichi-gun (JP)

(*) Notice: Subject to any disclaimer, the term of this patent is extended or adjusted under 35 U.S.C. 154(b) by 720 days.

(21) Appl. No.: 10/864,550

(22) Filed: Jun. 10, 2004

(65) Prior Publication Data
US 2004/0253514 A1    Dec. 16, 2004

(30) Foreign Application Priority Data

| Jun. 13, 2003 | (JP) | 2003-169823 |
| Jan. 23, 2004 | (JP) | 2004-016341 |
| Apr. 20, 2004 | (JP) | 2004-124059 |

(51) Int. Cl.
| H01M 4/58 | (2006.01) |
| C04B 35/03 | (2006.01) |
| C04B 35/00 | (2006.01) |
| C04B 35/04 | (2006.01) |
| B01D 53/22 | (2006.01) |
| B01D 53/56 | (2006.01) |
| C01B 3/00 | (2006.01) |
| B01J 20/00 | (2006.01) |

(52) U.S. Cl. .............. 502/411; 420/900; 423/324; 423/210; 423/248; 429/218.1; 429/218.2; 501/94; 501/96.1; 501/96.3; 501/108; 501/123; 501/133; 501/154; 502/232; 502/235; 502/236; 502/240; 502/340; 502/407

(58) Field of Classification Search ............. 502/411
See application file for complete search history.

(56) References Cited

U.S. PATENT DOCUMENTS 5,888,669 A * 3/1999 Thompson et al. ..... 429/231.95

(Continued)

FOREIGN PATENT DOCUMENTS

JP     10-8180      1/1998

(Continued)

OTHER PUBLICATIONS

Listing of CAS Registry Numbers and compositions of claimed alloys from JP 10008180.*

(Continued)

*Primary Examiner*—J. A. Lorengo
*Assistant Examiner*—Jennifer A Smith
(74) *Attorney, Agent, or Firm*—Oblon, Spivak, McClelland, Maier & Neustadt, P.C.

(57) ABSTRACT

A hydrogen storage material is expressed by a composition formula, $(Ca_{1-x}A_x)_{1-z}(Si_{1-y}B_y)_z$, wherein "A" is at least one member selected from the group consisting of alkali metal elements, alkaline-earth metal elements, rare-earth elements, the elements of groups 3 through 6, Ni, Au, In, Tl, Sn, Fe, Co, Cu and Ag; "B" is at least one member selected from the group consisting of the elements of groups 7 through 17, rare-earth elements, Hf and Be; $0 \leq x < 1$ by atomic ratio; $0 \leq y < 1$ by atomic ratio; and $0.38 \leq z \leq 0.58$ by atomic ratio. It is lightweight as well as less expensive. In principle, neither high-temperature nor high-pressure activation is required, because it exhibits a high initial activity. The operation temperature can be lowered and the hydrogen absorption content can be enlarged by controlling the kind and substitution proportion of the substituent elements appropriately.

13 Claims, 1 Drawing Sheet

U.S. PATENT DOCUMENTS

2004/0253514 A1 * 12/2004 Aoki et al. ............... 429/218.2

FOREIGN PATENT DOCUMENTS

| JP | 2000-96173 | 4/2000 |
| JP | 2003-119529 | 4/2003 |

OTHER PUBLICATIONS

E. Alejandro Leon-Escamilla, et al., "Hydrogen Impurity Effects. $A_5Tt_3$ Intermetallic Compounds between A=Ca, Sr, Ba, Eu and Tt=Si, Ge, Sn with $Cr_5B_3$-like Structures that are Stable Both as Binary and as Ternary Hydride and Fluoride Phases", Journal of Solid State Chemistry vol. 159, May 11, 2001, pp. 149-162.

Yasuaki Ohsumi, "Shinban Suiso Kyuzo Gokin-Sono Bussei To Ohyo (Hydrogen Occluding Alloy-The Physical Properties and Applications, New Edition)", Feb. 5, 1999, pp. 14-18.

E. Alejandro Leon-Escamilla, et al., "Hydrogen Impurity Effects. $A_5 Tt_3$ Intermetallic Compounds between A = Ca, Sr, Ba, Eu and Tt = Si, Ge, Sn with $Cr_5 B_3$-like Structures that are Stable Both as Binary and as Ternary Hydride and Fluoride Phases", Journal of Solid State Chemistry vol. 159, May 11, 2001, pp. 149-162.

* cited by examiner

HYDROGEN STORAGE MATERIAL

BACKGROUND OF THE INVENTION

1. Field of the Invention

The present invention relates to a hydrogen storage material which can sorb and desorb hydrogen reversibly.

2. Description of the Related Art

In view of the environmental problems, such as the global warming due to the carbon dioxide emission, and the energy problems, such as the depletion of fossil fuel, a hydrogen energy has been attracting engineer's attention as a clean alternative energy recently. In order to put a hydrogen energy into practical applications, it is important to develop technologies for storing and transporting hydrogen safely. Carbon materials, such as activated carbons, fullerenes and carbon nanotubes, and hydrogen occluding alloys have been developed as hydrogen storage materials which can store hydrogen. Among them, hydrogen occluding alloys have been expected to be new transportable storage media because they can store a large amount of hydrogen as metallic hydrides in the form of solid, a safe form.

Many alloys have been known as hydrogen occluding alloys. For example, $LaNi_5$ comprising a hexagonal system $CaCu_5$ type crystal structure, and TiFe comprising a cubic system CsCl type crystal structure are practical hydrogen occluding alloys which can store and release hydrogen at room temperature, as disclosed in pp., 14-16, "SHINBAN SUISO KYUZO GOKIN—SONO BUSSEI TO OHYO (Hydrogen Occluding Alloy—The Physical Properties and Applications, New Edition)" written by OHSUMI Yasuaki and published by KABUSHIKI KAISHA AGNE GIJUTSU CENTER in Feb. 5, 1999. Moreover, $Ca(Si_{2-x}B_x)_y$ comprising a hexagonal system C12 type crystal structure wherein $0<x\leq0.5$ and $0.8\leq y\leq1.2$, and $Ca_5Si_3$ comprising $Cr_5B_3$ type crystal structure are proposed as hydrogen occluding alloys whose constituent elements are Ca and Si existing abundantly as resources in nature, as disclosed in Japanese Unexamined Patent Publication (KOKAI) No. 10-8180 and in pp., 149-162, "J. Solid State Chem.," 2001, Volume 159, respectively.

$LaNi_5$ and TiFe include rare metals such as La, Ni and Ti, and accordingly suffer from drawbacks that it is difficult to secure the constituent elements as resources, and that they are very expensive. Moreover, $LaNi_5$ and TiFe exhibit hydrogen absorptions of 2% or less per unit weight only, because they themselves are heavy hydrogen occluding alloys. In particular, it is difficult to hydrogenate TiFe initially. Consequently, in order to let TiFe absorb and desorb hydrogen, it is necessary to activate it at a high temperature under a high pressure in advance. On the other hand, it is difficult for $Ca(Si_{2-x}B_x)_y$ and $Ca_5Si_3$ to absorb hydrogen at around room temperature. In addition, in order to let $Ca(Si_{2-x}B_x)_y$ and $Ca_5Si_3$ absorb and desorb hydrogen, it is likewise necessary to activate them at a high temperature under a high pressure similarly to TiFe.

SUMMARY OF THE INVENTION

The present invention has been developed in view of such circumstances. It is therefore an object of the present invention to provide a hydrogen storage material which can be activated with ease, and which is not only lightweight but also less expensive.

A hydrogen storage material according to the present invention is expressed by a composition formula, $(Ca_{1-x}A_x)_{1-z}(Si_{1-y}B_y)_z$, wherein "A" is at least one member selected from the group consisting of alkali metal elements, alkaline-earth metal elements, rare-earth elements, the elements of groups 3 through 6, Ni, Au, In, Tl, Sn, Fe, Co, Cu and Ag;

"B" is at least one member selected from the group consisting of the elements of groups 7 through 17, rare-earth elements, Hf and Be;

"x" falls in a range of from 0 (inclusive) to 1 (not inclusive) by atomic ratio, $0 \leq x < 1$;

"y" falls in a range of from 0 (inclusive) to 1 (not inclusive) by atomic ratio, $0 \leq y < 1$; and "z" falls in a range of from 0.38 (inclusive) to 0.58 (inclusive) by atomic ratio, $0.38 \leq z \leq 0.58$.

In the present specification, the elements are identified based on the 1989 IUPAC periodic table of the elements. Specifically, the elements of group 3 are Sc and Y; the elements of group 4 are Ti, Zr and Hf; the elements of group 5 are V, Nb and Ta; the elements of group 6 are Cr, Mo and W; the elements of group 7 are Mn, Tc and Re; the elements of group 8 are Fe, Ru and Os; the elements of group 9 are Co, Rh and Ir; the elements of group 10 are Ni, Pd and Pt; the elements of group 11 are Cu, Ag and Au; the elements of group 12 are Zn, Cd and Hg; the elements of group 13 are B, Al, Ga, In and Tl; the elements of group 14 are C, Si, Ge, Sn and Pb; the elements of group 15 are N, P, As, Sb and Bi; the elements of group 16 are O, S, Se, Te and Po; and the elements of group 17 are F, Cl, Br, I and At. In the present specification, the rare-earth elements mean elements whose atomic number is from 57 to 71.

The present hydrogen storage material comprises Ca and Si as the fundamental elements. The Clarke number, the average abundance of an element existing in the earth's crust expressed as a percentage by weight, is 3.39 for Ca and 25.8 for Si. Namely, Ca and Si are present fifth and second most abundant in the crust, respectively, and accordingly are not only abundant as resources but also less expensive. Moreover, Ca and Si are lightweight comparatively. Therefore, the present hydrogen storage material whose fundamental constituent elements are Ca and Si makes a material which is lightweight as well as less expensive.

In the present hydrogen storage material, Ca is an element which is likely to react with hydrogen, but Si is an element which is less likely to react with hydrogen. Moreover, in the present hydrogen storage material, the element "B" substituting for a part of the Si sites is an element which stabilizes hydrogen in the present hydrogen storage material. The element "B" plays a role of making hydrogen be likely to be absorbed when being alloyed with the element "A," for instance. When the element "B" substitutes for a part of the Si sites, new hydrogen absorption sites arise in the present hydrogen storage material. As a result, the present hydrogen storage material exhibits an increased hydrogen absorption content. On the other hand, Ca is likely to form oxides. Consequently, the resulting oxide film formed on the surface of the present hydrogen storage material might impair the hydrogenation of the present hydrogen storage material. Note that, however, the element "A" substituting for a part of the Ca sites is an element which reacts with hydrogen at a faster reaction rate. When the element "A" reacting with hydrogen at a faster reaction rate substitutes for a part of the Ca sites, the oxide film is inhibited from forming. As a result, the hydrogenation of the present hydrogen storage material is promoted, and hydrogen is absorbed at a much faster absorption rate.

Thus, in the present hydrogen storage material, the hydrogen absorption-desorption temperature or operation temperature and the hydrogen absorption-desorption content can be readily adjusted by controlling the kind and substitution proportion of the substituent elements. When the present hydrogen storage material has optimum compositions, it is possible to keep the operation temperature low, and to enlarge the hydrogen absorption content. Moreover, the present hydrogen storage material exhibits a high initial activity. Accordingly, in principle, it is not necessary to subject the present hydrogen storage material to activation processes at high temperatures under high pressures.

In the present hydrogen storage material, the value "z" in the composition formula is limited so that it falls in a range of from 0.38 (inclusive) to 0.58 (inclusive) by atomic ratio, $0.38 \leq z \leq 0.58$. When having such a composition, the major phase of the present hydrogen storage material is likely to be made of a compound phase comprising a crystal structure which is likely to absorb hydrogen, such as a CrB type crystal structure and an FeB type crystal structure. Here, the "major phase" designates a compound phase which is included in the present hydrogen storage material and whose volumetric proportion is 30% or more thereof. When the major phase comprises a CrB type crystal structure or an FeB type crystal structure, the present hydrogen storage material operates at a low temperature, and exhibits good hydrogen absorption-desorption abilities, such as exhibiting a large hydrogen absorption content.

A process according to the present invention for controlling a volumetric proportion of a compound phase in a hydrogen storage material comprises:

subjecting the present hydrogen storage material to a hydrogen absorption-desorption treatment in which hydrogen is absorbed in and desorbed from the hydrogen storage material at a temperature of from room temperature to 400° C., thereby controlling a volumetric proportion of a specific compound phase included in the hydrogen storage material.

In general, hydrogen storage materials can desirably include compound phases whose hydrogen absorption ability is high in a large volumetric proportion. As for a method of changing a volumetric proportion of a specific compound phase, heat treatment methods have been known. Heat treatment methods utilize the difference between the stabilities of compound phases depending on temperatures. Specifically, hydrogen storage materials are held at a temperature at which a compound phase is stable but the other compound phases are unstable for a long period of time, thereby increasing the volumetric proportion of the stable compound phase. Conventionally, hydrogen storage materials have been held at a high temperature of about 950° C. for approximately 30 hours in order to increase the volumetric proportion of compound phases whose hydrogen absorption abilities are high.

As described above, the present hydrogen storage material can absorb and desorb hydrogen at low temperatures relatively. The present inventors tried to control a volumetric proportion of compound phases included in the present hydrogen storage material by utilizing the advantageous characteristic. As a result, they come to know that a volumetric proportion of specific compound phases is changed by absorbing and desorbing hydrogen at a relatively low temperature falling in a range of from room temperature to 400° C. The advantage is believed to result from the fact that the crystallite size of specific phases decreases when they absorb hydrogen and accordingly each of the constituent atoms is likely to diffuse. Consequently, the present compound-phase volumetric-proportion controlling process can increase a volumetric proportion of compound phases whose hydrogen absorption abilities are high, for instance, at low temperatures for a short period of time. Moreover, it is possible to let the present hydrogen storage material comprise a specific compound phase alone.

A process for improving a hydrogen absorption rate of the present hydrogen storage material comprises:

mixing a metal comprising at least one member selected from the group consisting of the elements of groups 3 through 12 with the hydrogen storage material while applying a mechanical energy to the resulting mixture.

In general, the elements of groups 3 through 12 exhibit a catalytic ability of dissociating hydrogen. molecules to hydrogen atoms. Accordingly, when the present hydrogen storage material is mixed with a metal comprising at least one member selected from the group consisting of the elements of groups 3 through 12, the dissociation of hydrogen molecules is facilitated on the surface of the present hydrogen storage material. Consequently, it is possible to upgrade the hydrogen absorption rate of the present hydrogen storage material.

The present hydrogen storage material is not only light-weight but also less expensive, because its fundamental constituent elements of the optimum composition are Ca and Si, as described above. Moreover, the present hydrogen storage material exhibits a high initial activity. Therefore, in principle, it is not necessary to activate the present hydrogen storage material at high temperatures under high pressures. In addition, the present hydrogen storage material can operate at a much lower temperature by controlling the kind and substitution proportion of the substituent elements appropriately, and thereby can exhibit a much larger hydrogen absorption content.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
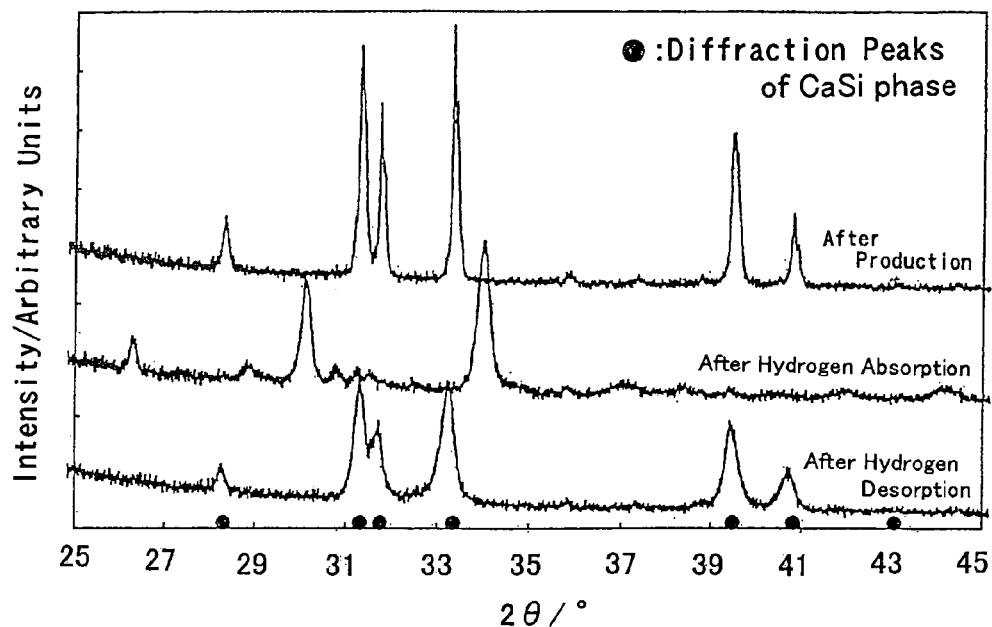
FIG. 1 shows X-ray diffraction profiles of $Ca_{0.5}Si_{0.5}$.

Having generally described the present invention, a further understanding can be obtained by reference to the specific preferred embodiments which are provided herein for the purpose of illustration only and not intended to limit the scope of the appended claims.

The present hydrogen storage material, the present compound-phase volumetric-proportion controlling process, and the present hydrogen-absorption-rate improving process will be hereinafter described in detail. Note that the present invention is not limited to the following specific embodiments. It will be possible for one of ordinary skill in the art to carry out the present hydrogen storage material, the present compound-phase volumetric-proportion controlling process, and the present hydrogen-absorption-rate improving process in various modes provided with such changes and modifications that he or she can think of.

Hydrogen Storage Material

The present hydrogen storage material is expressed by a composition formula, $(Ca_{1-x}A_x)_{1-z}(Si_{1-y}B_y)_z$, wherein "A" is at least one member selected from the group consisting of alkali metal elements, alkaline-earth metal elements, rare-earth elements, the elements of groups 3 through 6, Ni, Au, In, Tl, Sn, Fe, Co, Cu and Ag;

"B" is at least one member selected from the group consisting of the elements of groups 7 through 17, rare-earth elements, Hf and Be;

"x" falls in a range of from 0 (inclusive) to 1 (not inclusive) by atomic ratio, $0 \leq x<1$;

"y" falls in a range of from 0 (inclusive) to 1 (not inclusive) by atomic ratio, $0 \leq y \leq 1$; and "z" falls in a range of from 0.38 (inclusive) to 0.58 (inclusive) by atomic ratio, $0.38 \leq z \leq 0.58$.

As one of the specific embodiments of the present hydrogen storage material, it is possible to name $Ca_{1-z}Si_z$ comprising a CrB type crystal structure wherein "z" falls in a range of from 0.38 (inclusive) to 0.58 (inclusive) by atomic ratio, $0.38 \leq z \leq 0.58$. Note that $Ca_{1-z}Si_z$ is equivalent to the present hydrogen storage material wherein "x"=0 and "y"=0 in the composition formula. $Ca_{1-z}Si_z$ produces advantages that it is less expensive and can be produced with ease, because it is composed of Ca and Si only which are lightweight and less expensive.

As described above, Ca is an element which is likely to react with hydrogen; but Si is an element which is less likely to react with hydrogen. Accordingly, in the $Ca_{1-z}Si_z$, hydrogen is likely to be occupied in sites which are surrounded by the Ca atoms alone. On the other hand, there are sites in which the Si atoms exist around hydrogen atoms and the hydrogen atoms and Si atoms interact with each other. Such sites exhibit high energies, and are unstable. Consequently, hydrogen is less likely to be absorbed in such sites.

Moreover, another specific embodiment, $(Ca_{1-x}A_x)_{1-z}(Si_{1-y}B_y)_z$ comprising an FeB type crystal structure, operates likewise. In $(Ca_{1-x}A_x)_{1-z}(Si_{1-y}B_y)_z$ as well, there are sites which are surrounded by the Ca atoms alone, and hydrogen is likely to be occupied in the sites. On the other hand, there are sites in which the hydrogen atoms and Si atoms are close each other, and hydrogen is accordingly less likely to be occupied in the sites.

Therefore, from the viewpoint of enlarging the hydrogen absorption content more, such a mode is desirable that elements stabilizing hydrogen in the present hydrogen storage material substitute for a part of the Si sites. For example, it is desirable to employ such a mode that the present hydrogen storage material can be expressed by a compositional formula, $Ca_{1-z}(Si_{1-y}B_y)_z$, wherein "B" is at least one member selected from the group consisting of the elements of groups 7 through 17, rare-earth elements, Hf and Be;

"y" falls in a range of from 0 (not inclusive) to 1 (not inclusive) by atomic ratio, $0<y<1$; and "z" falls in a range of from 0.38 (inclusive) to 0.58 (inclusive) by atomic ratio, $0.38 \leq z \leq 0.58$.

The mode is equivalent to the present hydrogen storage material wherein "x"=0 in the composition formula, $(Ca_{1-x}A_x)_{1-z}(Si_{1-y}B_y)_z$. Note that the proportion of the substituent element "B," the value "y," is $0<y<1$. However, due to the reasons, e.g., to further lightweight the present hydrogen storage material and to make it more likely to have a CrB type crystal structure, it is more suitable that the value "y" can be $0<y \leq 0.5$.

In the present hydrogen storage material, the element "B" substituting for the Si sites is at least one member selected from the group consisting of the elements of groups 7 through 17, rare-earth elements, Hf and Be, because they readily substitute for Si atoms and can have a CrB type or FeB type crystal structure. Among them, it is suitable that the element "B" can be at least one member selected from the group consisting of Ni, Be, Fe, Cu and Se. Note that the atomic radii of Ni, Be, Fe, Cu and Se are close to the atomic radius of Si. Accordingly, even when these elements substitute for a part of the Si sites, the crystallographic parameters are less likely to change, and the substitution affects the hydrogen absorption-desorption characteristic less. Moreover, when the element "B" is at least one member selected from the group consisting of Al, S and Cl, the resulting present hydrogen storage material is much less expensive. In addition, it is suitable that the element "B" can be at least one member selected from the group consisting of Ni, B, Al, Co, Ce, Nd, Zn, Ga, Ge, Sn, Br, Sm, Er and Hf, due to the reason that they produce the effect of highly stabilizing hydrogen in the present hydrogen storage material. In particular, it is desirable that the element "B" can be at least one member selected from the group consisting of Cu and Zn, because they are lightweight comparatively and are produced with ease.

Another mode will be hereinafter described, in which the element "A" substitutes for a part of the Ca sites in the $Ca_{1-z}Si_z$. As described above, Ca is likely to form oxides, and accordingly the resulting oxide films formed on the surface of the present hydrogen storage material might impair the hydrogenation of the present hydrogen storage material. From the viewpoint of inhibiting the hydrogen absorption-desorption ability from being lowered by poisoned material surface and enlarging the hydrogen absorption rate, it is desirable to let elements exhibiting a faster rate of reaction with hydrogen substitute for a part of the Ca sites. For example, it is desirable to employ such a mode that the present hydrogen storage material can be expressed by a compositional formula, $(Ca_{1-x}A_x)_{1-z}Si_z$, wherein "A" is at least one member selected from the group consisting of alkali metal elements, alkaline-earth metal elements, rare-earth elements, the elements of groups 3 through 6, Ni, Au, In, Tl, Sn, Fe, Co, Cu and Ag;

"x" falls in a range of from 0 (not inclusive) to 1 (not inclusive) by atomic ratio, $0<x<1$;

"z" falls in a range of from 0.38 (inclusive) to 0.58 (inclusive) by atomic ratio, $0.38 \leq z \leq 0.58$.

The mode is equivalent to the present hydrogen storage material wherein "y"=0 in the composition formula, $(Ca_{1-x}A_x)_{1-z}(Si_{1-y}B_y)_z$. Note that the proportion of the substituent element "A," the value "x," is $0<x<1$. However, due to the following reasons, e.g., to further lightweight the present hydrogen storage material and to make it more likely to have a CrB type crystal structure, it is more suitable that the value "x" can be $0<x \leq 0.5$.

In the present hydrogen storage material, the element "A" substituting for the Ca sites is at least one member selected from the group consisting of alkali metal elements, alkaline-earth metal elements, rare-earth elements, the elements of group 3 through 6, Ni, Au, In, Tl, Sn, Fe, Co, Cu and Ag, because they readily substitute for Ca atoms and can have a CrB type or FeB type crystal structure. Among them, it is suitable that the element "A" can be at least one member selected from the group consisting of rare-earth elements, due to the reason that they exhibit a faster rate of reaction with hydrogen and produce the effect of highly improving the activities of the present hydrogen storage material. In particular, it is desirable that the element "A" can be La, because the present hydrogen storage material can be activated initially with ease and exhibits good durability. Note that, when the element "A" is at least one member selected from the group consisting of Ti, V, Cr, Sr, Ba, Ce, Nd, Fe and Cu, the present hydrogen storage material is much less expensive than the hydrogen storage material which employs La as the element "A."

So far, the present hydrogen storage material has been described with reference to the modes whose basic composition is $Ca_{1-z}Si_z$ and in which the other elements "A" and "B" substitute for the Ca sites and Si sites respectively. However, the present hydrogen storage material is not limited to the above-described modes. For example, it is possible to employ such a mode that the other elements "A" and "B" substitute for both Ca sites and Si sites. This mode is suitable, because the respective substituent elements demonstrate their substitution effects synergetically. In this instance, it is desirable to employ those specifics pertaining to the above-described suitable modes for the kind and substitution proportion of the elements "A" and "B."

The present hydrogen storage material can desirably comprise a major phase which is composed of a compound phase comprising a CrB type crystal structure or an FeB type crystal structure. When the present hydrogen storage material comprises a CrB type or FeB type crystal structure, it exhibits a better hydrogen absorption-desorption ability. In the present hydrogen storage material, the value "z" of the composition formula is $0.38 \leq z \leq 0.58$. With such a composition, the compound phase comprising a CrB type or FeB type crystal structure is likely to turn into the major phase. It is more suitable that the value "z" can be $0.45 \leq z \leq 0.55$.

The production process of the present hydrogen storage material is not limited in particular. It is possible to produce the present hydrogen storage material by ordinary production processes of alloys, such as arc melting methods and high-frequency induction melting methods, that is, by following processes in which metals are mixed to make a target composition, are melted and are thereafter solidified.

Compound-Phase Controlling Process

The present compound-phase controlling process comprises: subjecting the present hydrogen storage material to a hydrogen absorption-desorption treatment in which hydrogen is absorbed in and desorbed from the hydrogen storage material at a temperature of from room temperature to 400° C., thereby controlling a volumetric proportion of a specific compound phase included in the hydrogen storage material.

The hydrogen absorption-desorption treatment is carried out at a temperature of from room temperature to 400° C. Depending on specific hydrogen storage materials, it is advisable to appropriately employ an optimum temperature for absorbing and desorbing hydrogen. Then, hydrogen is absorbed in the hydrogen storage material at a predetermined temperature under a prescribed hydrogen pressure. Thereafter, hydrogen is evacuated to let the hydrogen storage material desorb hydrogen at a predetermined temperature. Hydrogen can be absorbed in and desorbed from the hydrogen storage material for 1 to 5 hours, respectively. The hydrogen absorption-desorption treatment changes the volumetric proportion of specific compound phases.

As suitable modes for the compound phase whose volumetric proportion is controlled, there is a compound phase comprising a CrB type crystal structure or a compound phase comprising an FeB type crystal structure, for example. Both CrB type crystal structure and FeB type crystal structure exhibit high hydrogen absorption abilities. Hence, it is possible to enhance the hydrogen absorption-desorption ability of the present hydrogen storage material by increasing the volumetric proportion of the compound phases comprising the crystal structures.

Hydrogen-Absorption-Rate Improving Process

The present hydrogen-absorption-rate improving process comprises: mixing a metal comprising at least one member selected from the group consisting of the elements of groups 3 through 12 with the hydrogen storage material while applying a mechanical energy to the resulting mixture. As for the metal to be mixed with the hydrogen storage material, it is advisable to use at least one member selected from the group consisting of Zn, Fe and Ni. In particular, Ni is a suitable option.

The mixing of the metal with the present hydrogen storage material can be carried out by a mechanical processing, such as mechanical milling, mechanical grinding and mechanical alloying. For instance, the present hydrogen storage material and the metal to be mixed therewith can be put into a predetermined processing apparatus, and can be subjected to a mechanical processing in an inert gas atmosphere. As for the processing apparatus, it is possible to use a planetary ball mill, a vibration ball mill, a jet mill or a hammer mill. The specific conditions of the mechanical processing can be determined depending on using apparatuses and amounts of raw materials to be processed or reacted.

EXAMPLES

In accordance with the above-described specific embodiments, examples of the present hydrogen storage material were produced variously. Then, hydrogen was absorbed in and desorbed from the produced hydrogen storage materials under predetermined conditions, and the hydrogen storage materials were evaluated for the hydrogen absorption-desorption ability. Each of the produced hydrogen storage materials will be hereinafter described.

(1) $Ca_{0.5}Si_{0.5}$ (a) Production of $Ca_{0.5}Si_{0.5}$

About 250 g Ca grains with 99.5% purity and about 180 g Si chips with 99.999% purity were mixed, were put into a mold, and were melted in vacuum. After cooling the molten mixture of itself, the resulting ingot was pulverized in a glove box filled with an argon gas, thereby producing powdery $Ca_{0.5}Si_{0.5}$. The resultant $Ca_{0.5}Si_{0.5}$ was subjected to X-ray diffraction measurements by means of a powder method using $CuK_\alpha$ radiation. FIG. 1 shows the X-ray diffraction profile of the $Ca_{0.5}Si_{0.5}$. Note that FIG. 1 simultaneously shows the X-ray diffraction profiles of the $Ca_{0.5}Si_{0.5}$ which was scanned after it was subjected to a later-described hydrogen absorption-desorption treatment. From the X-ray diffraction profiles shown in FIG. 1, it was confirmed that the resultant $Ca_{0.5}Si_{0.5}$ comprised a single CaSi phase substantially; and the crystal structure was a CrB type. Moreover, it was also confirmed that the $Ca_{0.5}Si_{0.5}$ recovered the original CrB type crystal structure after it absorbed and desorbed hydrogen.

(b) Evaluation on Hydrogen Absorption-Desorption Ability

The produced $Ca_{0.5}Si_{0.5}$ was put into a chamber pressurized with hydrogen. Without carrying out any activation treatment, hydrogen was absorbed in the $Ca_{0.5}Si_{0.5}$ at a temperature of 200° C. under a hydrogen pressure of 6 MPa. The absorbed hydrogen amount was measured by means of Sieverts method (as per Japanese Industrial Standard (JIS) H 7201-1991, being the same hereinafter), which determines a pressure-composition isotherm. After about 3 hours had passed since the beginning of the hydrogen absorption, the hydrogen absorption content was 2% by weight approximately. Thereafter, when hydrogen was evacuated from the chamber by a rotary pump at a temperature of 200° C., the $Ca_{0.5}Si_{0.5}$ desorbed the entire amount of the absorbed hydrogen.

Figure 2:
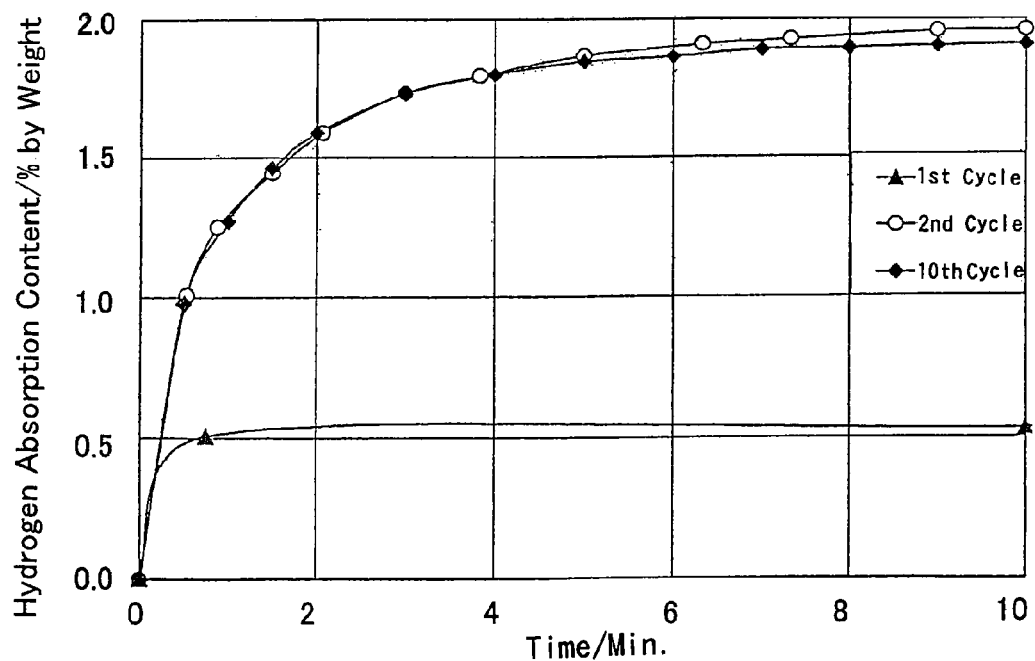
FIG. 2 shows the variation of the hydrogen absorption content with time exhibited by $Ca_{0.5}Si_{0.5}$ at 200° C. under 6 MPa.

Subsequently, the hydrogen absorption-desorption was carried out 10 cycles in total in the same manner as described above. As a result, after the 2nd cycle or later, the hydrogen absorption content was 2% by weight approximately after about 10 minutes from the beginning of the hydrogen absorption. Moreover, at a temperature of 200° C., the $Ca_{0.5}Si_{0.5}$ desorbed the entire amount of the absorbed hydrogen. FIG. 2 shows the variation of the hydrogen absorption content with time of the $Ca_{0.5}Si_{0.5}$. As shown in FIG. 2, in the 1st cycle, the hydrogen absorption content was 0.5% by weight approximately after about 10 minutes from the beginning of the hydrogen absorption. However, in the 2nd cycle and the 10th cycle, the hydrogen absorption rate was so fast that the hydrogen absorption content was 2% by weight approximately after about 10 minutes from the beginning of the hydrogen absorption. In addition, after the 2nd cycle or later, it was possible to absorb hydrogen even at room temperature.

From the above-described facts, it was possible to confirm that the $Ca_{0.5}Si_{0.5}$, an example of the present hydrogen storage material, could absorb and desorb hydrogen without subjecting it to any activation treatment. Moreover, it was possible to verify that the $Ca_{0.5}Si_{0.5}$ operated at a low temperature comparatively and exhibited a large hydrogen absorption content.

(2) $Ca_{0.6}Si_{0.4}$ (a) Production of $Ca_{0.6}Si_{0.4}$

About 2 g Ca grains with 99.5% purity and about 1 g Si chips with 99.999% purity were mixed, and were melted by high frequency induction melting in an argon gas atmosphere. After cooling the molten mixture of itself, the resulting ingot was pulverized in a glove box filled with an argon gas, thereby producing powdery $Ca_{0.6}Si_{0.4}$. The resultant $Ca_{0.6}Si_{0.4}$ was subjected to X-ray diffraction measurements in the same manner as described above. From the resulting X-ray diffraction profiles, it was confirmed that a CaSi phase comprising a CrB type crystal structure was the major phase in the resultant $Ca_{0.6}Si_{0.4}$. Moreover, it was also confirmed that the $Ca_{0.6}Si_{0.4}$ recovered the original CrB type crystal structure after it absorbed and desorbed hydrogen.

(b) Evaluation on Hydrogen Absorption-Desorption Ability

The produced $Ca_{0.6}Si_{0.4}$ was put into a chamber pressurized with hydrogen. Without carrying out any activation treatment, hydrogen was absorbed in the $Ca_{0.6}Si_{0.4}$ at a temperature of 150° C. under a hydrogen pressure of 6 MPa. As a result, the $Ca_{0.6}Si_{0.4}$ absorbed hydrogen in an amount of 1% by weight approximately. Thereafter, when hydrogen was evacuated from the chamber by a rotary pump at a temperature of 200° C., the $Ca_{0.6}Si_{0.4}$ desorbed the entire amount of the absorbed hydrogen. Subsequently, the hydrogen absorption-desorption was carried out 10 cycles in total in the same manner as described above. In the 2nd through 10th cycles, the hydrogen absorption content was about equal to that in the 1st cycle. Moreover, in all of the cycles, the $Ca_{0.6}Si_{0.4}$ desorbed the entire amount of the absorbed hydrogen at a temperature of 200° C.

From the above-described facts, it was possible to confirm that the $Ca_{0.6}Si_{0.4}$, an example of the present hydrogen storage material, could absorb and desorb hydrogen without subjecting it to any activation treatment. Moreover, it was possible to verify that the $Ca_{0.6}Si_{0.4}$ operated at a low temperature comparatively.

(3) $Ca_{0.42}Si_{0.58}$ (a) Production of $Ca_{0.42}Si_{0.58}$

About 1 g Ca grains with 99.5% purity and about 1 g Si powder with 99.999% purity were mixed, were thereafter cold pressed, and were further heated with a heating furnace in an argon gas atmosphere. After cooling the molten mixture of itself, the resulting ingot was pulverized in a glove box filled with an argon gas, thereby producing powdery $Ca_{0.42}Si_{0.58}$. The resultant $Ca_{0.42}Si_{0.58}$ was subjected to X-ray diffraction measurements in the same manner as described above. From the resulting X-ray diffraction profiles, it was confirmed that a CaSi phase comprising a CrB type crystal structure was the major phase in the resultant $Ca_{0.42}Si_{0.58}$. Moreover, it was also confirmed that the $Ca_{0.42}Si_{0.58}$ recovered the original CrB type crystal structure after it absorbed and desorbed hydrogen.

(b) Evaluation on Hydrogen Absorption-Desorption Ability

The produced $Ca_{0.42}Si_{0.58}$ was put into a chamber pressurized with hydrogen. Without carrying out any activation treatment, hydrogen was absorbed in the $Ca_{0.42}Si_{0.58}$ at a temperature of 150° C. under a hydrogen pressure of 6 MPa. As a result, the $Ca_{0.42}Si_{0.58}$ absorbed hydrogen in an amount of 1% by weight approximately. Thereafter, when hydrogen was evacuated from the chamber by a rotary pump at a temperature of 200° C., the $Ca_{0.42}Si_{0.58}$ desorbed the entire amount of the absorbed hydrogen. Subsequently, the hydrogen absorption-desorption was carried out 10 cycles in total in the same manner as described above. In the 2nd through 10th cycles, the hydrogen absorption content was about equal to that in the 1st cycle. Moreover, in all of the cycles, the $Ca_{0.42}Si_{0.58}$ desorbed the entire amount of the absorbed hydrogen at a temperature of 200° C.

From the above-described facts, it was possible to confirm that the $Ca_{0.42}Si_{0.58}$, an example of the present hydrogen storage material, could absorb and desorb hydrogen without subjecting it to any activation treatment. Moreover, it was possible to verify that the $Ca_{0.42}Si_{0.58}$ operated at a low temperature comparatively.

(4) $Ca_{0.55}(Si_{0.75}Cu_{0.25})_{0.45}$ (a) Production of $Ca_{0.55}(Si_{0.75}Cu_{0.25})_{0.45}$ About 1.7 g Ca grains with 99.5% purity, about 0.7 g Si powder with 99.999% purity and about 0.6 g Cu powder with 99.9% purity were mixed, were thereafter cold pressed, and were further heated with a heating furnace in an argon gas atmosphere. Thereafter, the molten mixture was quenched, and the resulting ingot was pulverized in a glove box filled with an argon gas, thereby producing powdery $Ca_{0.55}(Si_{0.75}Cu_{0.25})_{0.45}$. The resultant $Ca_{0.55}(Si_{0.75}Cu_{0.25})_{0.45}$ was subjected to X-ray diffraction measurements in the same manner as described above. From the resulting X-ray diffraction profiles, it was confirmed that a Ca(Si, Cu) phase comprising a CrB type crystal structure was the major phase in the resultant $Ca_{0.55}(Si_{0.75}Cu_{0.25})_{0.45}$. Moreover, it was also confirmed that the $Ca_{0.55}(Si_{0.75}Cu_{0.25})_{0.45}$ recovered the original CrB type crystal structure after it absorbed and desorbed hydrogen.

(b) Evaluation on Hydrogen Absorption-Desorption Ability

The produced $Ca_{0.55}(Si_{0.75}Cu_{0.25})_{0.45}$ was put into a chamber pressurized with hydrogen. Without carrying out any activation treatment, hydrogen was absorbed in the $Ca_{0.55}(Si_{0.75}Cu_{0.25})_{0.45}$ at a temperature of 70° C. under a hydrogen pressure of 6 MPa. As a result, the $Ca_{0.55}(Si_{0.75}Cu_{0.25})_{0.45}$ absorbed hydrogen in an amount of 2.5% by weight approximately. Thereafter, when hydrogen was evacuated from the chamber by a rotary pump at a temperature of 180° C., the $Ca_{0.55}(Si_{0.75}Cu_{0.25})_{0.45}$ desorbed the entire amount of the absorbed hydrogen. Subsequently, the hydrogen absorption-desorption was carried out 10 cycles in total in the same manner as described above. In the 2nd through 10th cycles, the hydrogen absorption content was about equal to that in the 1st cycle. Moreover, in all of the cycles, the $Ca_{0.55}(Si_{0.75}Cu_{0.25})_{0.45}$ desorbed the entire amount of the absorbed hydrogen at a temperature of 180° C.

From the above-described facts, it was possible to confirm that the $Ca_{0.55}(Si_{0.75}Cu_{0.25})_{0.45}$, an example of the present hydrogen storage material, could absorb and desorb hydrogen without subjecting it to any activation treatment. Moreover, it was possible to verify that the $Ca_{0.55}(Si_{0.75}Cu_{0.25})_{0.45}$ operated at a low temperature and exhibited a large hydrogen absorption content.

(5) $Ca_{0.5}(Si_{0.25}Cu_{0.75})_{0.5}$ (a) Production of $Ca_{0.5}(Si_{0.25}Cu_{0.75})_{0.5}$ About 255 g Ca grains with 99.5% purity, about 45 g Si chips with 99.999% purity and about 300 g Cu grains with 99.9% purity were mixed, were put into a mold, and were melted in vacuum. After cooling the molten mixture of itself, the resulting ingot was pulverized in a glove box filled with an argon gas, thereby producing powdery $Ca_{0.5}(Si_{0.25}Cu_{0.75})_{0.5}$.

(b) Evaluation on Hydrogen Absorption-Desorption Ability

The produced $Ca_{0.5}(Si_{0.25}Cu_{0.75})_{0.5}$ was put into a chamber pressurized with hydrogen. Without carrying out any activation treatment, hydrogen was absorbed in the $Ca_{0.5}(Si_{0.25}Cu_{0.75})_{0.5}$ at a temperature of 100° C. under a hydrogen pressure of 2 MPa. As a result, the $Ca_{0.5}(Si_{0.25}Cu_{0.75})_{0.5}$ absorbed hydrogen in an amount of 1.2% by weight approximately.

From the above-described facts, it was possible to confirm that the $Ca_{0.5}(Si_{0.25}Cu_{0.75})_{0.5}$, an example of the present hydrogen storage material, could absorb and desorb hydrogen without subjecting it to any activation treatment.

(6) $Ca_{0.5}(Si_{0.7}Zn_{0.3})_{0.5}$ (a) Production of $Ca_{0.5}(Si_{0.7}Zn_{0.3})_{0.5}$ About 1 g Ca grains with 99.5% purity, about 0.5 g Si chips with 99.999% purity and about 0.5 g Zn grains with 99.9% purity were mixed, were put into a mold, and were melted in vacuum. Thereafter, the molten mixture was quenched, and the resulting ingot was pulverized in a glove box filled with an argon gas, thereby producing powdery $Ca_{0.5}(Si_{0.7}Zn_{0.3})_{0.5}$. The resultant $Ca_{0.5}(Si_{0.7}Zn_{0.3})_{0.5}$ was subjected to X-ray diffraction measurements in the same manner as described above. From the resulting X-ray diffraction profiles, it was confirmed that a Ca(Si, Zn) phase comprising a CrB type crystal structure was the major phase in the resultant $Ca_{0.5}(Si_{0.7}Zn_{0.3})_{0.5}$. Moreover, it was also confirmed that the $Ca_{0.5}(Si_{0.7}Zn_{0.3})_{0.5}$ recovered the original CrB type crystal structure after it absorbed and desorbed hydrogen.

(b) Evaluation on Hydrogen Absorption-Desorption Ability

The produced $Ca_{0.5}(Si_{0.7}Zn_{0.3})_{0.5}$ was put into a chamber pressurized with hydrogen. Without carrying out any activation treatment, hydrogen was absorbed in the $Ca_{0.5}(Si_{0.7}Zn_{0.3})_{0.5}$ at a temperature of 70° C. under a hydrogen pressure of 6 MPa. As a result, the $Ca_{0.5}(Si_{0.7}Zn_{0.3})_{0.5}$ absorbed hydrogen in an amount of 2.5% by weight approximately. Thereafter, when hydrogen was evacuated from the chamber by a rotary pump at a temperature of 200° C., the $Ca_{0.5}(Si_{0.7}Zn_{0.3})_{0.5}$ desorbed the entire amount of the absorbed hydrogen. Subsequently, the hydrogen absorption-desorption was carried out 10 cycles in total in the same manner as described above. In the 2nd through 10th cycles, the hydrogen absorption content was about equal to that in the 1st cycle. Moreover, in all of the cycles, the $Ca_{0.5}(Si_{0.7}Zn_{0.3})_{0.5}$ desorbed the entire amount of the absorbed hydrogen at a temperature of 200° C.

From the above-described facts, it was possible to confirm that the $Ca_{0.5}(Si_{0.7}Zn_{0.3})_{0.5}$, an example of the present hydrogen storage material, could absorb and desorb hydrogen without subjecting it to any activation treatment. Moreover, it was possible to verify that the $Ca_{0.5}(Si_{0.7}Zn_{0.3})_{0.5}$ operated at a low temperature and exhibited a large hydrogen absorption content.

(7) $Ca_{0.42}(Si_{0.3}Zn_{0.7})_{0.58}$ (a) Production of $Ca_{0.42}(Si_{0.3}Zn_{0.7})_{0.58}$ About 1 g Ca grains with 99.5% purity, about 0.3 g Si chips with 99.999% purity and about 1.7 g Zn grains with 99.9% purity were mixed, and were melted by high frequency induction melting in an argon gas atmosphere. After cooling the molten mixture of itself, the resulting ingot was pulverized in a glove box filled with an argon gas, thereby producing powdery $Ca_{0.42}(Si_{0.3}Zn_{0.7})_{0.58}$.

(b) Evaluation on Hydrogen Absorption-Desorption Ability

The produced $Ca_{0.42}(Si_{0.3}Zn_{0.7})_{0.58}$ was put into a chamber pressurized with hydrogen. Without carrying out any activation treatment, hydrogen was absorbed in the $Ca_{0.42}(Si_{0.3}Zn_{0.7})_{0.58}$ at a temperature of 100° C. under a hydrogen pressure of 3 MPa. As a result, the $Ca_{0.42}(Si_{0.3}Zn_{0.7})_{0.58}$ absorbed hydrogen in an amount of 1% by weight approximately.

From the above-described facts, it was possible to confirm that the $Ca_{0.42}(Si_{0.3}Zn_{0.7})_{0.58}$, an example of the present hydrogen storage material, could absorb and desorb hydrogen without subjecting it to any activation treatment.

(8) $(Ca_{0.2}La_{0.8})_{0.45}Si_{0.55}$ (a) Production of $(Ca_{0.2}La_{0.8})_{0.45}Si_{0.55}$ LaSi was produced by an arc melting method in advance, and was pulverized to prepare an LaSi powder. About 1.7 g LaSi powder, about 0.1 g Ca grains with 99.5% purity and about 0.2 g Si powder with 99.999% purity were mixed, were thereafter cold pressed, and were further heated with a heating furnace in an argon gas atmosphere. After water cooling the molten mixture, the resulting ingot was pulverized in a glove box filled with an argon gas, thereby producing powdery $(Ca_{0.2}La_{0.8})_{0.45}Si_{0.55}$. The resultant $(Ca_{0.2}La_{0.8})_{0.45}Si_{0.55}$ was subjected to X-ray diffraction measurements in the same manner as described above. From the resulting X-ray diffraction profiles, it was confirmed that a (Ca, La)Si phase comprising an FeB type crystal structure was the major phase in the resultant $(Ca_{0.2}La_{0.8})_{0.45}Si_{0.55}$. Moreover, it was also confirmed that the $(Ca_{0.2}La_{0.8})_{0.45}Si_{0.55}$ recovered the original FeB type crystal structure after it absorbed and desorbed hydrogen.

(b) Evaluation on Hydrogen Absorption-Desorption Ability

The produced $(Ca_{0.2}La_{0.8})_{0.45}Si_{0.55}$ was put into a chamber pressurized with hydrogen. Without carrying out any activation treatment, hydrogen was absorbed in the $(Ca_{0.2}La_{0.8})_{0.45}Si_{0.55}$ at a temperature of 400° C. under a hydrogen pressure of 2 MPa. As a result, the $(Ca_{0.2}La_{0.8})_{0.45}Si_{0.55}$ absorbed hydrogen in an amount of 0.7% by weight approximately. Thereafter, when hydrogen was evacuated from the chamber by a rotary pump at a temperature of 450° C., the $(Ca_{0.2}La_{0.8})_{0.45}Si_{0.55}$ desorbed the entire amount of the absorbed hydrogen.

From the above-described facts, it was possible to confirm that the $(Ca_{0.2}La_{0.8})_{0.45}Si_{0.55}$, an example of the present hydrogen storage material, could absorb and desorb hydrogen without subjecting it to any activation treatment.

(9) $(Ca_{0.8}La_{0.2})_{0.6}Si_{0.4}$ (a) Production of $(Ca_{0.8}La_{0.2})_{0.6}Si_{0.4}$ About 1.2 g Ca grains with 99.5% purity, about 0.7 g Si chips with 99.999% purity and about 1.1 g La grains with 99.9% purity were mixed, and were melted by high frequency induction melting in an argon gas atmosphere. After cooling the molten mixture of itself, the resulting ingot was pulverized in a glove box filled with an argon gas, thereby producing powdery $(Ca_{0.8}La_{0.2})_{0.6}Si_{0.4}$. The resultant $(Ca_{0.8}La_{0.2})_{0.6}Si_{0.4}$ was subjected to X-ray diffraction measurements in the same manner as described above. From the resulting X-ray diffraction profiles, it was confirmed that a (Ca, La) Si phase comprising a CrB type crystal structure was the major phase in the resultant $(Ca_{0.8}La_{0.2})_{0.6}Si_{0.4}$. Moreover, it was also confirmed that the $(Ca_{0.8}La_{0.2})_{0.6}Si_{0.4}$ recovered the original CrB type crystal structure after it absorbed and desorbed hydrogen.

(b) Evaluation on Hydrogen Absorption-Desorption Ability

The produced $(Ca_{0.8}La_{0.2})_{0.6}Si_{0.4}$ was put into a chamber pressurized with hydrogen. Without carrying out any activation treatment, hydrogen was absorbed in the $(Ca_{0.8}La_{0.2})_{0.6}Si_{0.4}$ at a temperature of 150° C. under a hydrogen pressure of 6 MPa. As a result, the $(Ca_{0.8}La_{0.2})_{0.6}Si_{0.4}$ absorbed hydrogen in an amount of 1.2% by weight approximately. Thereafter, when hydrogen was evacuated from the chamber by a rotary pump at a temperature of 200° C., the $(Ca_{0.8}La_{0.2})_{0.6}Si_{0.4}$ desorbed the entire amount of the absorbed hydrogen. Subsequently, the hydrogen absorption-desorption was carried out 10 cycles in total in the same manner as described above. In the 2nd through 10th cycles, the hydrogen absorption content was about equal to that in the 1st cycle. Moreover, in all of the cycles, the $(Ca_{0.8}La_{0.2})_{0.6}Si_{0.4}$ desorbed the entire amount of the absorbed hydrogen at a temperature of 200° C.

From the above-described facts, it was possible to confirm that the $(Ca_{0.8}La_{0.2})_{0.6}Si_{0.4}$, an example of the present hydrogen storage material, could absorb and desorb hydrogen without subjecting it to any activation treatment. Moreover, it was possible to verify that the $(Ca_{0.8}La_{0.2})_{0.6}Si_{0.4}$ operated at a low temperature comparatively.

(10) $Ca_{0.53}(Si_{0.8}Ge_{0.2})_{0.47}$ (a) Production of $Ca_{0.53}(Si_{0.8}Ge_{0.2})_{0.47}$ About 1.6 g Ca grains with 99.5% purity, about 0.9 g Si powder with 99.999% purity and about 0.6 g Ge powder with 99.9% purity were mixed, and were melted by high frequency induction melting in an argon gas atmosphere. Moreover, the molten mixture was subjected to a heat treatment at 950° C. for 30 hours in an argon gas atmosphere, and were thereafter water cooled, thereby producing an ingot. The resulting ingot was pulverized in a glove box filled with an argon gas, thereby producing powdery $Ca_{0.53}(Si_{0.8}Ge_{0.2})_{0.47}$. The resultant $Ca_{0.53}(Si_{0.8}Ge_{0.2})_{0.47}$ was subjected to X-ray diffraction measurements in the same manner as described above. From the resulting X-ray diffraction profiles, it was confirmed that the $Ca_{0.53}(Si_{0.8}Ge_{0.2})_{0.47}$ comprised a single phase virtually and had a crystal structure in which Ge substituted for a part of the Si sites of a CaSi phase comprising a CrB type crystal structure.

(b) Evaluation on Hydrogen Absorption-Desorption Ability

The produced $Ca_{0.53}(Si_{0.8}Ge_{0.2})_{0.47}$ was put into a chamber pressurized with hydrogen. Without carrying out any activation treatment, hydrogen was absorbed in the $Ca_{0.53}(Si_{0.8}Ge_{0.2})_{0.47}$ at a temperature of 100° C. under a hydrogen pressure of 9 MPa. As a result, the $Ca_{0.53}(Si_{0.8}Ge_{0.2})_{0.47}$ absorbed hydrogen in an amount of 1.7% by weight approximately. Thereafter, when hydrogen was evacuated from the chamber by a rotary pump at a temperature of 150° C., the $Ca_{0.53}(Si_{0.8}Ge_{0.2})_{0.47}$ desorbed the entire amount of the absorbed hydrogen virtually. Subsequently, the hydrogen absorption-desorption was carried out 10 cycles in total in the same manner as described above. In the 2nd through 10th cycles, the hydrogen absorption content was about equal to that in the 1st cycle. Moreover, in all of the cycles, the $Ca_{0.53}$ $(Si_{0.8}Ge_{0.2})_{0.47}$ desorbed the entire amount of the absorbed hydrogen at a temperature of 150° C. virtually.

From the above-described facts, it was possible to confirm that the $Ca_{0.53}(Si_{0.8}Ge_{0.2})_{0.47}$, an example of the present hydrogen storage material, could absorb and desorb hydrogen without subjecting it to any activation treatment. Moreover, it was possible to verify that the $Ca_{0.53}(Si_{0.8}Ge_{0.2})_{0.47}$ operated at a low temperature comparatively.

(11) $Ca_{0.5}(Si_{0.5}Ge_{0.5})_{0.5}$ (a) Production of $Ca_{0.5}(Si_{0.5}Ge_{0.5})_{0.5}$ About 1.3 g Ca grains with 99.5% purity, about 0.5 g Si powder with 99.999% purity and about 1.2 g Ge powder with 99.9% purity were mixed, and were melted by high frequency induction melting in an argon gas atmosphere. Moreover, the molten mixture was subjected to a heat treatment at 950° C. for 30 hours in an argon gas atmosphere, and was thereafter water cooled, thereby producing an ingot. The resulting ingot was pulverized in a glove box filled with an argon gas, thereby producing powdery $Ca_{0.05}(Si_{0.05}Ge_{0.5})_{0.5}$.

(b) Evaluation on Hydrogen Absorption-Desorption Ability

The produced $Ca_{0.5}(Si_{0.5}Ge_{0.5})_{0.5}$ was put into a chamber pressurized with hydrogen. Without carrying out any activation treatment, hydrogen was absorbed in the $Ca_{0.5}(Si_{0.5}Ge_{0.5})_{0.5}$ at a temperature of 100° C. under a hydrogen pressure of 9.5 MPa. As a result, the $Ca_{0.5}(Si_{0.5}Ge_{0.5})_{0.5}$ absorbed hydrogen in an amount of 1.5% by weight approximately. Thereafter, when hydrogen was evacuated from the chamber by a rotary pump at a temperature of 150° C., the $Ca_{0.5}(Si_{0.5}Ge_{0.5})_{0.5}$ desorbed the entire amount of the absorbed hydrogen virtually. Subsequently, the hydrogen absorption-desorption was carried out 10 cycles in total in the same manner as described above. In the 2nd through 10th cycles, the hydrogen absorption content was about equal to that in the 1st cycle. Moreover, in all of the cycles, the $Ca_{0.5}(Si_{0.5}Ge_{0.5})_{0.5}$ desorbed the entire amount of the absorbed hydrogen at a temperature of 150° C. virtually.

From the above-described facts, it was possible to confirm that the $Ca_{0.5}(Si_{0.5}Ge_{0.5})_{0.5}$, an example of the present hydrogen storage material, could absorb and desorb hydrogen without subjecting it to any activation treatment. Moreover, it was possible to verify that the $Ca_{0.5}(Si_{0.5}Ge_{0.5})_{0.5}$ operated at a low temperature comparatively.

(12) $(Ca_{0.8}Li_{0.2})_{0.53}Si_{0.47}$ (a) Production of $(Ca_{0.8}Li_{0.2})_{0.53}Si_{0.47}$ About 1.1 g Ca grains with 99.5% purity, about 0.85 g Si powder with 99.999% purity and about 0.05 g Li grains with 99% or more purity were mixed, were heated to 1,000° C. by a heating furnace in an argon gas atmosphere, were held thereat for 5 minutes. Thereafter, the molten mixture was water cooled, and the resulting ingot was pulverized in a glove box filled with an argon gas, thereby producing powdery $(Ca_{0.8}Li_{0.2})_{0.53}Si_{0.47}$.

(b) Evaluation on Hydrogen Absorption-Desorption Ability

The produced $(Ca_{0.8}Li_{0.2})_{0.53}Si_{0.47}$ was put into a chamber pressurized with hydrogen. Without carrying out any activation treatment, hydrogen was absorbed in the $(Ca_{0.8}Li_{0.2})_{0.53}Si_{0.47}$ at a temperature of 250° C. under a hydrogen pressure of 9 MPa. As a result, the $(Ca_{0.8}Li_{0.2})_{0.53}Si_{0.47}$ absorbed hydrogen in an amount of 2.2% by weight approximately. Thereafter, when hydrogen was evacuated from the chamber by a rotary pump at a temperature of 250° C., the $(Ca_{0.8}Li_{0.2})_{0.53}Si_{0.47}$ desorbed the entire amount of the absorbed hydrogen virtually. Thus, it was possible to confirm that the $(Ca_{0.8}Li_{0.2})_{0.53}Si_{0.47}$, an example of the present hydrogen storage material, could absorb and desorb a large amount of hydrogen without subjecting it to any activation treatment.

(13) $(Ca_{0.47}Li_{0.53})_{0.47}Si_{0.53}$ (a) Production of $(Ca_{0.47}Li_{0.53})_{0.47}Si_{0.53}$ About 0.7 g Ca grains with 99.5% purity, about 1.2 g Si powder with 99.999% purity and about 0.1 g Li grains with 99% or more purity were mixed, were heated to 1,000° C. by a heating furnace in an argon gas atmosphere, were held thereat for 3 minutes. Thereafter, the molten mixture was water cooled, and the resulting ingot was pulverized in a glove box filled with an argon gas, thereby producing powdery $(Ca_{0.47}Li_{0.53})_{0.47}Si_{0.53}$.

(b) Evaluation on Hydrogen Absorption-Desorption Ability

The produced $(Ca_{0.47}Li_{0.53})_{0.47}Si_{0.53}$ was put into a chamber pressurized with hydrogen. Hydrogen was absorbed in the $(Ca_{0.47}Li_{0.53})_{0.47}Si_{0.53}$ at a temperature of 300° C. under a hydrogen pressure of 9 MPa. As a result, the $(Ca_{0.47}Li_{0.53})_{0.47}Si_{0.53}$ absorbed hydrogen in an amount of 2.5% by weight approximately. Thereafter, when hydrogen was evacuated from the chamber by a rotary pump at a temperature of 300° C., the $(Ca_{0.47}Li_{0.53})_{0.47}Si_{0.53}$ desorbed the entire amount of the absorbed hydrogen virtually. Thus, it was possible to confirm that the $(Ca_{0.47}Li_{0.53})_{0.47}Si_{0.53}$, an example of the present hydrogen storage material, could absorb and desorb a large amount of hydrogen.

(14) $Ca_{0.5}(Si_{0.8}Ag_{0.2})_{0.5}$ (a) Production of $Ca_{0.5}(Si_{0.8}Ag_{0.2})_{0.5}$ About 1.4 g Ca grains with 99.5% purity, about 0.8 g Si powder with 99.999% purity and about 0.8 g Ag powder with 99.9% purity were mixed, and were melted by high frequency induction melting in an argon gas atmosphere. Moreover, the molten mixture was subjected to a heat treatment at 660° C. for 24 hours in an argon gas atmosphere, and was thereafter water cooled, thereby producing an ingot. The resulting ingot was pulverized in a glove box filled with an argon gas, thereby producing powdery $Ca_{0.5}(Si_{0.8}Ag_{0.2})_{0.5}$.

(b) Evaluation on Hydrogen Absorption-Desorption Ability

The produced $Ca_{0.5}(Si_{0.8}Ag_{0.2})_{0.5}$ was put into a chamber pressurized with hydrogen. Without carrying out any activation treatment, hydrogen was absorbed in the $Ca_{0.5}(Si_{0.8}Ag_{0.2})_{0.5}$ at a temperature of 150° C. under a hydrogen pressure of 9 MPa. As a result, the $Ca_{0.5}(Si_{0.8}Ag_{0.2})_{0.5}$ absorbed hydrogen in an amount of 1.5% by weight approximately. Thereafter, when hydrogen was evacuated from the chamber by a rotary pump at a temperature of 200° C., the $Ca_{0.5}(Si_{0.8}Ag_{0.2})_{0.5}$ desorbed the entire amount of the absorbed hydrogen virtually. Thus, it was possible to confirm that the $Ca_{0.5}(Si_{0.8}Ag_{0.2})_{0.5}$, an example of the present hydrogen storage material, could absorb and desorb hydrogen without subjecting it to any activation treatment. Moreover, it was possible to verify that the $Ca_{0.5}(Si_{0.8}Ag_{0.2})_{0.5}$ operated at a low temperature comparatively.

(15) $Ca_{0.5}(Si_{0.5}Ag_{0.5})_{0.5}$ (a) Production of $Ca_{0.5}(Si_{0.5}Ag_{0.5})_{0.5}$ About 1.1 g Ca grains with 99.5% purity, about 0.4 g Si powder with 99.999% purity and about 1.5 g Ag powder with 99.9% purity were mixed, and were melted by high frequency induction melting in an argon gas atmosphere. Moreover, the molten mixture was subjected to a heat treatment at 660° C. for 30 hours in an argon gas atmosphere, and was thereafter water cooled, thereby producing an ingot. The resulting ingot was pulverized in a glove box filled with an argon gas, thereby producing powdery $Ca_{0.5}(Si_{0.5}Ag_{0.5})_{0.5}$.

(b) Evaluation on Hydrogen Absorption-Desorption Ability

The produced $Ca_{0.5}(Si_{0.5}Ag_{0.5})_{0.5}$ was put into a chamber pressurized with hydrogen. Without carrying out any activation treatment, hydrogen was absorbed in the $Ca_{0.5}(Si_{0.5}Ag_{0.5})_{0.5}$ at a temperature of 150° C. under a hydrogen pressure of 9 MPa. As a result, the $Ca_{0.5}(Si_{0.5}Ag_{0.5})_{0.5}$ absorbed hydrogen in an amount of 1.2% by weight approximately. Thus, it was possible to confirm that the $Ca_{0.5}(Si_{0.5}Ag_{0.5})_{0.5}$, an example of the present hydrogen storage material, could absorb hydrogen at a low temperature comparatively without subjecting it to any activation treatment.

(16) $Ca_{0.5}(Si_{0.7}Ni_{0.3})_{0.5}$ (a) Production of $Ca_{0.5}(Si_{0.7}Ni_{0.3})_{0.5}$ About 1.6 g Ca grains with 99.5% purity, about 0.8 g Si powder with 99.999% purity and about 0.7 g Ni powder with 99.9% purity were mixed, and were melted by high frequency induction melting in an argon gas atmosphere. After quenching the molten mixture, the resulting ingot was pulverized in a glove box filled with an argon gas, thereby producing powdery $Ca_{0.5}(Si_{0.7}Ni_{0.3})_{0.5}$.

(b) Evaluation on Hydrogen Absorption-Desorption Ability

The produced $Ca_{0.5}(Si_{0.7}Ni_{0.3})_{0.5}$ was put into a chamber pressurized with hydrogen. Without carrying out any activation treatment, hydrogen was absorbed in the $Ca_{0.5}(Si_{0.7}Ni_{0.3})_{0.5}$ at a temperature of 80° C. under a hydrogen pressure of 9.5 MPa. As a result, the $Ca_{0.5}(Si_{0.7}Ni_{0.3})_{0.5}$ absorbed hydrogen in an amount of 2.2% by weight approximately. Thereafter, when hydrogen was evacuated from the chamber by a rotary pump at a temperature of 200° C., the $Ca_{0.5}(Si_{0.7}Ni_{0.3})_{0.5}$ desorbed the entire amount of the absorbed hydrogen virtually. Thus, it was possible to confirm that the $Ca_{0.5}(Si_{0.7}Ni_{0.3})_{0.5}$, an example of the present hydrogen storage material, could absorb and desorb hydrogen without subjecting it to any activation treatment. Moreover, it was possible to verify that the $Ca_{0.5}(Si_{0.7}Ni_{0.3})_{0.5}$ could absorb hydrogen at an extremely low temperature and exhibited a large hydrogen absorption content.

(17) $Ca_{0.5}(Si_{0.3}Ni_{0.7})_{0.5}$ (a) Production of $Ca_{0.5}(Si_{0.3}Ni_{0.7})_{0.5}$ About 1.3 g Ca grains with 99.5% purity, about 0.3 g Si powder with 99.999% purity and about 1.4 g Ni powder with 99.9% purity were mixed, and were melted by high frequency induction melting in an argon gas atmosphere. After cooling the molten mixture of itself, the resulting ingot was pulverized in a glove box filled with an argon gas, thereby producing powdery $Ca_{0.5}(Si_{0.3}Ni_{0.7})_{0.5}$.

(b) Evaluation on Hydrogen Absorption-Desorption Ability

The produced $Ca_{0.5}(Si_{0.3}Ni_{0.7})_{0.5}$ was put into a chamber pressurized with hydrogen. Without carrying out any activation treatment, hydrogen was absorbed in the $Ca_{0.5}(Si_{0.3}Ni_{0.7})_{0.5}$ at a temperature of 150° C. under a hydrogen pressure of 9 MPa. As a result, the $Ca_{0.5}(Si_{0.3}Ni_{0.7})_{0.5}$ absorbed hydrogen in an amount of 1% by weight approximately. Thus, it was possible to confirm that the $Ca_{0.5}(Si_{0.3}Ni_{0.7})_{0.5}$, an example of the present hydrogen storage material, could absorb hydrogen at a low temperature comparatively without subjecting it to any activation treatment.

(18) $Ca_{0.4}Ti_{0.1}Si_{0.5}$ (a) Production of $Ca_{0.4}Ti_{0.1}Si_{0.5}$

About 2.3 g Ca grains with 99.5% purity, about 2 g Si powder with 99.999% purity and about 0.7 g Ti powder with 99.9% purity were mixed, and were melted by high frequency induction melting in an argon gas atmosphere. After cooling the molten mixture of itself, the resulting ingot was pulverized in a glove box filled with an argon gas, thereby producing powdery $Ca_{0.4}Ti_{0.1}Si_{0.5}$ (or $(Ca_{0.8}Ti_{0.2})_{0.5}Si_{0.5}$).

(b) Evaluation on Hydrogen Absorption-Desorption Ability

The produced $Ca_{0.4}Ti_{0.1}Si_{0.5}$ was put into a chamber pressurized with hydrogen. Without carrying out any activation treatment, hydrogen was absorbed in the $Ca_{0.4}Ti_{0.1}Si_{0.5}$ at a temperature of 200° C, under a hydrogen pressure of 9 MPa. As a result, the $Ca_{0.4}Ti_{0.1}Si_{0.5}$ absorbed hydrogen in an amount of 1.4% by weight approximately. Thus, it was possible to confirm that the $Ca_{0.4}Ti_{0.1}Si_{0.5}$, an example of the present hydrogen storage material, could absorb hydrogen at a low temperature comparatively without subjecting it to any activation treatment.

(19) $Ca_{0.4}V_{0.1}Si_{0.5}$ (a) Production of $Ca_{0.4}V_{0.1}Si_{0.5}$

About 2.3 g Ca grains with 99.5% purity, about 2 g Si powder with 99.999% purity and about 0.7 g V powder with 99.9% purity were mixed, and were melted by high frequency induction melting in an argon gas atmosphere. After cooling the molten mixture of itself, the resulting ingot was pulverized in a glove box filled with an argon gas, thereby producing powdery $Ca_{0.4}V_{0.1}Si_{0.5}$ (or $(Ca_{0.8}V_{0.2})_{0.5}Si_{0.5}$).

(b) Evaluation on Hydrogen Absorption-Desorption Ability

The produced $Ca_{0.4}V_{0.1}Si_{0.5}$ was put into a chamber pressurized with hydrogen. Without carrying out any activation treatment, hydrogen was absorbed in the $Ca_{0.4}V_{0.1}Si_{0.5}$ at a temperature of 200° C. under a hydrogen pressure of 9 MPa. As a result, the $Ca_{0.4}V_{0.1}Si_{0.5}$ absorbed hydrogen in an amount of 1.3% by weight approximately. Thus, it was possible to confirm that the $Ca_{0.4}V_{0.1}Si_{0.5}$, an example of the present hydrogen storage material, could absorb hydrogen at a low temperature comparatively without subjecting it to any activation treatment.

(20) $Ca_{0.4}Mg_{0.1}Si_{0.5}$ (a) Production of $Ca_{0.4}Mg_{0.1}Si_{0.5}$

About 2.5 g Ca grains with 99.5% purity, about 2.2 g Si powder with 99.999% purity and about 0.4 g Mg powder with 99.9% purity were mixed, and were melted by high frequency induction melting in an argon gas atmosphere. After cooling the molten mixture of itself, the resulting ingot was pulverized in a glove box filled with an argon gas, thereby producing powdery $Ca_{0.4}Mg_{0.1}Si_{0.5}$ (or $(Ca_{0.8}Mg_{0.2})_{0.5}Si_{0.5}$).

(b) Evaluation on Hydrogen Absorption-Desorption Ability

The produced $Ca_{0.4}Mg_{0.1}Si_{0.5}$ was put into a chamber pressurized with hydrogen. Without carrying out any activation treatment, hydrogen was absorbed in the $Ca_{0.4}Mg_{0.1}Si_{0.5}$ at a temperature of 150° C. under a hydrogen pressure of 9 MPa. As a result, the $Ca_{0.4}Mg_{0.1}Si_{0.5}$ absorbed hydrogen in an amount of 1.7% by weight approximately. Thus, it was possible to confirm that the $Ca_{0.4}Mg_{0.1}Si_{0.5}$, an example of the present hydrogen storage material, could absorb hydrogen at a low temperature comparatively without subjecting it to any activation treatment.

(21) $Ca_{0.5}Si_{0.4}Fe_{0.1}$ (a) Production of $Ca_{0.5}Si_{0.4}Fe_{0.1}$

About 2.7 g Ca grains with 99.5% purity, about 1.5 g Si powder with 99.999% purity and about 0.7 g Fe powder with 99.9% purity were mixed, and were melted by high frequency induction melting in an argon gas atmosphere. After cooling the molten mixture of itself, the resulting ingot was pulverized in a glove box filled with an argon gas, thereby producing powdery $Ca_{0.5}Si_{0.4}Fe_{0.1}$ (or $(Ca_{0.5}(Si_{0.8}Fe_{0.2})_{0.5}$).

(b) Evaluation on Hydrogen Absorption-Desorption Ability

The produced $Ca_{0.5}Si_{0.4}Fe_{0.1}$ was put into a chamber pressurized with hydrogen. Without carrying out any activation treatment, hydrogen was absorbed in the $Ca_{0.5}Si_{0.4}Fe_{0.1}$ at a temperature of 200° C. under a hydrogen pressure of 9 MPa. As a result, the $Ca_{0.5}Si_{0.4}Fe_{0.1}$ absorbed hydrogen in an amount of 1.4% by weight approximately. Thus, it was possible to confirm that the $Ca_{0.5}Si_{0.4}Fe_{0.1}$, an example of the present hydrogen storage material, could absorb hydrogen at a low temperature comparatively without subjecting it to any activation treatment.

(22) $Ca_{0.46}(Si_{0.8}C_{0.2})_{0.54}$ (a) Production of $Ca_{0.46}(Si_{0.8}C_{0.2})_{0.54}$ About 0.9 g Ca grains with 99.5% purity, about 0.6 g Si powder with 99.999% purity and about 0.06 g C powder with 99% or more purity were mixed, and were melted by high frequency induction melting in an argon gas atmosphere. After cooling the molten mixture of itself, the resulting ingot was pulverized in a glove box filled with an argon gas, thereby producing powdery $Ca_{0.46}(Si_{0.8}C_{0.2})_{0.54}$.

(b) Evaluation on Hydrogen Absorption-Desorption Ability

The produced $Ca_{0.46}(Si_{0.8}C_{0.2})_{0.54}$ was put into a chamber pressurized with hydrogen. Without carrying out any activation treatment, hydrogen was absorbed in the $Ca_{0.46}(Si_{0.8}C_{0.2})_{0.54}$ at a temperature of 120° C. under a hydrogen pressure of 9 MPa. As a result, the $Ca_{0.46}(Si_{0.8}C_{0.2})_{0.54}$ absorbed hydrogen in an amount of 2.2% by weight approximately. Thereafter, when hydrogen was evacuated from the chamber by a rotary pump at a temperature of 200° C., the $Ca_{0.46}(Si_{0.8}C_{0.2})_{0.54}$ desorbed the entire amount of the absorbed hydrogen virtually. Thus, it was possible to confirm that the $Ca_{0.46}(Si_{0.8}C_{0.2})_{0.54}$, an example of the present hydrogen storage material, could absorb and desorb hydrogen without subjecting it to any activation treatment. Moreover, it was possible to verify that the $Ca_{0.46}(Si_{0.8}C_{0.2})_{0.54}$ operated at a low temperature comparatively.

(23) $Ca_{0.55}(Si_{0.7}B_{0.3})_{0.45}$ (a) Production of $Ca_{0.55}(Si_{0.7}B_{0.3})_{0.45}$ About 1 g Ca grains with 99.5% purity, about 0.4 g Si powder with 99.999% purity and about 0.1 g B powder with 99% or more purity were mixed, and were melted by high frequency induction melting in an argon gas atmosphere. After cooling the molten mixture of itself, the resulting ingot was pulverized in a glove box filled with an argon gas, thereby producing powdery $Ca_{0.55}(Si_{0.7}B_{0.3})_{0.45}$.

(b) Evaluation on Hydrogen Absorption-Desorption Ability

The produced $Ca_{0.55}(Si_{0.7}B_{0.3})_{0.45}$ was put into a chamber pressurized with hydrogen. Without carrying out any activation treatment, hydrogen was absorbed in the $Ca_{0.55}(Si_{0.7}B_{0.3})_{0.45}$ at a temperature of 120° C. under a hydrogen pressure of 9 MPa. As a result, the $Ca_{0.55}(Si_{0.7}B_{0.3})_{0.45}$ absorbed hydrogen in an amount of 2.1% by weight approximately. Thereafter, when hydrogen was evacuated from the chamber by a rotary pump at a temperature of 200° C., the $Ca_{0.55}(Si_{0.7}B_{0.3})_{0.45}$ desorbed the entire amount of the absorbed hydrogen virtually. Thus, it was possible to confirm that the $Ca_{0.55}(Si_{0.7}B_{0.3})_{0.45}$, an example of the present hydrogen storage material, could absorb and desorb hydrogen without subjecting it to any activation treatment. Moreover, it was possible to verify that the $Ca_{0.55}(Si_{0.7}B_{0.3})_{0.45}$ operated at a low temperature comparatively.

(24) Controlling Volumetric Proportion of Compound Phase (a) Production of $Ca_{0.59}Si_{0.41}$ About 1.7 g Ca grains with 99.5% purity and about 0.8 g Si chips with 99.999% purity were mixed, and were melted by high frequency induction melting in an argon gas atmosphere. After cooling the molten mixture of itself, the resulting ingot was pulverized in a glove box filled with an argon gas, thereby producing powdery $Ca_{0.59}Si_{0.41}$.

(b) Hydrogen Absorption-Desorption Treatment

The produced $Ca_{0.59}Si_{0.41}$ was put into a chamber pressurized with hydrogen. Then, hydrogen was absorbed in the $Ca_{0.59}Si_{0.41}$ at a temperature of 200° C. under a hydrogen pressure of 8 MPa. Thereafter, absorbed hydrogen was desorbed from the $Ca_{0.59}Si_{0.41}$ at a temperature of 300° C. The $Ca_{0.59}Si_{0.41}$ was subjected to X-ray diffraction measurements before and after the hydrogen absorption-desorption treatment. Before the hydrogen absorption-desorption treatment, a $Ca_5Si_3$ phase and a CaSi phase were observed in the $Ca_{0.59}Si_{0.41}$. On the other hand, after the hydrogen absorption-desorption treatment, only the CaSi phase was observed therein. That is, the hydrogen absorption-desorption treatment increased the volumetric proportion of the CaSi phase.

(25) Controlling Volumetric Proportion of Compound Phase (a) Production of $Ca_{0.5}(Si_{0.8}Ag_{0.2})_{0.5}$ About 1.4 g Ca grains with 99.5% purity, about 0.8 g Si powder with 99.999% purity and about 0.8 g Ag powder with 99.9% purity were mixed, and were melted by high frequency induction melting in an argon gas atmosphere. After cooling the molten mixture of itself, the resulting ingot was pulverized in a glove box filled with an argon gas, thereby producing powdery $Ca_{0.5}(Si_{0.8}Ag_{0.2})_{0.5}$.

(b) Hydrogen Absorption-Desorption Treatment

The produced $Ca_{0.5}(Si_{0.8}Ag_{0.2})_{0.5}$ was put into a chamber pressurized with hydrogen. Then, hydrogen was absorbed in the $Ca_{0.5}(Si_{0.8}Ag_{0.2})_{0.5}$ at a temperature of 200° C. under a hydrogen pressure of 8 MPa. Thereafter, absorbed hydrogen was desorbed from the $Ca_{0.5}(Si_{0.8}Ag_{0.2})_{0.5}$ at a temperature of 200° C. The $Ca_{0.5}(Si_{0.8}Ag_{0.2})_{0.5}$ was subjected to X-ray diffraction measurements before and after the hydrogen absorption-desorption treatment. Before the hydrogen absorption-desorption treatment, the $Ca_{0.5}(Si_{0.8}Ag_{0.2})_{0.5}$ was composed of a Ca(Si, Ag) phase comprising a CrB type crystal structure in an amount of 68% by volume approximately. On the other hand, after the hydrogen absorption-desorption treatment, the $Ca_{0.5}(Si_{0.8}Ag_{0.2})_{0.5}$ was composed of the phase in an amount of 85% by volume approximately. That is, the hydrogen absorption-desorption treatment increased the volumetric proportion of the Ca(Si, Ag) phase.

(26) Controlling Volumetric Proportion of Compound Phase (a) Production of $(Ca_{0.5}Li_{0.5})_{0.5}Si_{0.5}$ About 0.6 g Ca grains with 99.5% purity, about 0.8 g Si powder with 99.999% purity and about 0.1 g Li grains with 99% or more purity were mixed, and were heated to 1,000° C. by a heating furnace in an argon gas atmosphere, were held thereat for 5 minutes. Thereafter, the molten mixture was water cooled, and the resulting ingot was pulverized in a glove box filled with an argon gas, thereby producing powdery $(Ca_{0.5}Li_{0.5})_{0.5}Si_{0.5}$.

(b) Hydrogen Absorption-Desorption Treatment

The produced $(Ca_{0.5}Li_{0.5})_{0.5}Si_{0.5}$ was put into a chamber pressurized with hydrogen. Then, hydrogen was absorbed in the $(Ca_{0.5}Li_{0.5})_{0.5}Si_{0.5}$ at a temperature of 350° C. under a hydrogen pressure of 7 MPa. Thereafter, the chamber was vacuumed to desorb absorbed hydrogen from the $(Ca_{0.5}Li_{0.5})_{0.5}Si_{0.5}$ at a temperature of 350° C. The $(Ca_{0.5}Li_{0.5})_{0.5}Si_{0.5}$ was subjected to X-ray diffraction measurements before and after the hydrogen absorption-desorption treatment. Before the hydrogen absorption-desorption treatment, a $Ca_{1.65}Li_{1.85}Si_4$ phase and a $CaLiSi_2$ phase were observed in the $(Ca_{0.5}Li_{0.5})_{0.5}Si_{0.5}$. On the other hand, after the hydrogen absorption-desorption treatment, only the $CaLiSi_2$ phase was observed therein. That is, the hydrogen absorption-desorption treatment increased the volumetric proportion of the $CaLiSi_2$ phase.

(27) Improving Hydrogen Absorption Rate of CaSi

A CaSi powder and an Ni powder having an average particle diameter of a couple of micrometers were put into a processing container of a planetary ball mill "P-5" produced by FRITSCH Co., Ltd. with a proportion of CaSi:Ni =1:0.1 by molar ratio, and were sealed under an argon gas atmosphere. Then, mechanical milling was carried out. Note that the mechanical milling was carried out at a motor revolving speed of 300 rpm for 3 hours. Thereafter, the mixture powder was taken out from the processing container in an argon gas atmosphere, and hydrogen was absorbed in the mixture powder at a temperature of 150° C. under a hydrogen pressure of 7 MPa. As a result, the rate of the hydrogen absorption content after 90 seconds from starting the absorption was 0.57 with respect to the maximum hydrogen absorption content. On the other hand, when only the CaSi powder was subjected to the mechanical milling, the simple CaSi powder exhibited the hydrogen absorption rate of 0.46. Thus, it is understood that the hydrogen absorption rate of CaSi could be upgraded by mixing with Ni powder by means of mechanical milling.

What is claimed is:
1. A hydrogen storage material, expressed by a composition formula, $(Ca_{1-x}A_x)_{1-z}(Si_{1-y}B_y)_z$, wherein
   "A" is at least one member selected from the group consisting of alkali metal elements, alkaline-earth metal elements, rare-earth elements, the elements of groups 3 through 6, Ni, Au, In, Tl, Sn, Fe, Co, Cu and Ag;
   "B" is at least one member selected from the group consisting of the elements of groups 7 through 12 and 14 through 17, Al, Ga, In, Tl, rare-earth elements, Hf and Be;
   "x" falls in a range of from 0 (not inclusive) to 1 (not inclusive) by atomic ratio, 0<x<1;
   "y" falls in a range of from 0 (not inclusive) to 1 (not inclusive) by atomic ratio, 0<y<1; and
   "z" falls in a range of from 0.38 (inclusive) to 0.58 (inclusive) by atomic ratio, $0.38 \leq z \leq 0.58$.
2. A hydrogen storage material, expressed by a composition formula, $Ca_{1-z}(Si_{1-y}B_y)_z$, wherein
   "B" is at least one member selected from the group consisting of Cu and Zn;
   "y" falls in a range of from 0 (not inclusive) to 1 (not inclusive) by atomic ratio, 0<y<1; and
   "z" falls in a range of from 0.38 (inclusive) to 0.58 (inclusive) by atomic ratio, $0.38 \leq z \leq 0.58$.
3. The hydrogen storage material set forth in claim 1, expressed by a composition formula, $(Ca_{1-x}A_x)_{1-z}Si_z$, wherein
   "A" is at least one member selected from the group consisting of alkali metal elements, alkaline-earth metal elements, rare-earth elements, the elements of groups 3 through 6, Ni, Au, In, Tl, Sn, Fe, Co, Cu and Ag;

"x" falls in a range of from 0 (not inclusive) to 1 (not inclusive) by atomic ratio, 0<x<1;

"z" falls in a range of from 0.38 (inclusive) to 0.58 (inclusive) by atomic ratio, $0.38 \leq z \leq 0.58$.

4. The hydrogen storage material set forth in claim 1, expressed by a composition formula, $(Ca_{1-x}A_x)_{1-z}Si_z$, wherein "A" is at least one member selected from the group consisting of rare-earth elements;

"x" falls in a range of from 0 (not inclusive) to 1 (not inclusive) by atomic ratio, 0<x<1;

"z" falls in a range of from 0.38 (inclusive) to 0.58 (inclusive) by atomic ratio, $0.38 \leq z \leq 0.58$.

5. A hydrogen storage material, expressed by a composition formula, $Ca_{1-z}Si_z$, wherein "z" falls in a range of from 0.38 (inclusive) to 0.58 (inclusive) by atomic ratio, $0.38 \leq z \leq 0.58$.

6. The hydrogen storage material set forth in claim 1, wherein the element "A" is La.

7. The hydrogen storage material set forth in claim 1, wherein the element "A" is at least one member selected from the group consisting of Ti, V, Cr, Sr, Ba, Ce, Nd, Fe and Cu.

8. The hydrogen storage material set forth in claim 1, wherein the element "B" is at least one member selected from the group consisting of Ni, Be, Fe, Cu and Se.

9. The hydrogen storage material set forth in claim 1, wherein the element "B" is at least one member selected from the group consisting of Al, S and Cl.

10. The hydrogen storage material set forth in claim 1, wherein the element "B" is at least one member selected from the group consisting of Ni, Al, Co, Ce, Nd, Zn, Ga, Ge, Sn, Br, Sm, Er and Hf.

11. A method of using a hydrogen storage material, the method comprising:

subjecting the hydrogen storage material set forth in claim 1 to a hydrogen absorption-desorption treatment in which hydrogen is absorbed in and desorbed from the hydrogen storage material at a temperature of from room temperature to 400° C., thereby controlling a volumetric proportion of a specific compound phase included in the hydrogen storage material.

12. A method of using a hydrogen material, the method comprising:

mixing a metal comprising at least one member selected from the group consisting of the elements of groups 3 through 12 with the hydrogen storage material set forth in claim 1 while applying a mechanical energy to the resulting mixture.

13. The method set forth in claim 12, wherein the metal is Ni.

* * * * *

UNITED STATES PATENT AND TRADEMARK OFFICE
CERTIFICATE OF CORRECTION

PATENT NO.         : 7,510,996 B2
APPLICATION NO. : 10/864550
DATED                 : March 31, 2009
INVENTOR(S)       : Masakazu Aoki et al.

Page 1 of 1

It is certified that error appears in the above-identified patent and that said Letters Patent is hereby corrected as shown below:

Column 5, line 9, "by atomic ratio, $0 \leq y \leq 1$; and"
should read -- by atomic ratio, $0 \leq y < 1$; and --.

Signed and Sealed this

First Day of September, 2009

David J. Kappos
*Director of the United States Patent and Trademark Office*